(12) United States Patent
Sampsell et al.

(10) Patent No.: US 6,606,175 B1
(45) Date of Patent: Aug. 12, 2003

(54) MULTI-SEGMENT LIGHT-EMITTING DIODE

(75) Inventors: Jeffrey B. Sampsell, Vancouver, WA (US); James M. Florence, Vancouver, WA (US); Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/268,877

(22) Filed: Mar. 16, 1999

(51) Int. Cl.$^7$ .............................................. H04B 10/00
(52) U.S. Cl. ..................... 359/154; 359/159; 359/155
(58) Field of Search ................................. 359/154, 159, 359/155, 362, 379, 619, 622, 620, 621

(56) References Cited

U.S. PATENT DOCUMENTS

| | | | | |
|---|---|---|---|---|
| 4,298,869 A | * | 11/1981 | Okuno ......................... | 257/88 |
| 4,647,927 A | * | 3/1987 | Ichikawa et al. ............. | 345/55 |
| 5,023,943 A | * | 6/1991 | Heberle ....................... | 359/142 |
| 5,059,008 A | * | 10/1991 | Flood et al. ................. | 349/202 |
| 5,060,302 A | * | 10/1991 | Grimes ........................ | 359/135 |
| 5,062,115 A | * | 10/1991 | Thornton ..................... | 372/45 |
| 5,191,461 A | * | 3/1993 | Cranshaw et al. ........... | 359/154 |
| 5,212,707 A | * | 5/1993 | Heidel et al. ................ | 372/50 |
| 5,245,460 A | * | 9/1993 | Allen et al. ................. | 359/155 |
| 5,299,219 A | * | 3/1994 | Hayakawa .................... | 372/50 |
| 5,317,170 A | * | 5/1994 | Paoli ........................... | 257/88 |
| 5,359,448 A | * | 10/1994 | Laszlo et al. ................ | 359/180 |
| 5,594,752 A | * | 1/1997 | Endriz .......................... | 372/50 |
| 5,602,863 A | * | 2/1997 | Itagaki ......................... | 257/82 |
| 5,663,581 A | * | 9/1997 | Holm et al. .................. | 257/93 |
| 5,666,226 A | * | 9/1997 | Ezra et al. ................... | 349/95 |
| 5,786,582 A | * | 7/1998 | Roustaei et al. ............. | 235/462 |
| 6,038,005 A | * | 3/2000 | Handschy et al. ............ | 349/57 |
| 6,160,664 A | * | 12/2000 | Du et al. ...................... | 359/618 |

FOREIGN PATENT DOCUMENTS

| | | | | |
|---|---|---|---|---|
| GB | | 2221810 A | * 2/1990 | ............ H04B/9/00 |

* cited by examiner

Primary Examiner—Leslie Pascal
Assistant Examiner—David C Payne
(74) Attorney, Agent, or Firm—Karen Dana Oster

(57) ABSTRACT

A power conservative multi-segment LED transmitter including a multi-segment LED with a plurality of independently addressable LED segments, each LED segment suitable for selectively emitting a beam segment. A controller selectively enables and disables the LED segments. Depending on whether the beam segments overlap or not and whether low or high power is supplied to the enabled LED segments, the combined resulting beam may be a low power steered beam, a power conservative steered beam, an overlapping low power intense steered beam, or an overlapping power conservative steered beam. The steerable multi-segment LED transmitter and receiver system preferably includes an "all enabled" state in which each of the LED segments are enabled and emit a respective beam segment; a "training" state in which the LED segments are selectively enabled and disabled and the receiver determines substantially detected beam segments; and a "steered" state in which only the LED segments emitting the substantially detected beam segments are enabled.

20 Claims, 4 Drawing Sheets

38
OVERLAPPING
BEAM
PATTERN

MULTI-SEGMENT LIGHT-EMITTING DIODE

BACKGROUND OF THE INVENTION

The present invention relates to a multi-segment light-emitting diode (LED), and particularly to a new type of incoherent LED suitable for point-to-point communication functions.

As shown in FIG. 1, a conventional LED communication link includes a LED transmitter 10 that emits a broad radiative angle beam 12. When a receiver 14 detects the presence of the beam 12, the communication link has been established.

The design of LED communication channels presents two contradictory requirements. The first requirement is that broad beam coverage is necessary to simplify pointing and to reduce sensitivity to pointing direction. The second requirement is the necessity of low power usage to increase battery life. Broad beam coverage requires significantly more power than narrow beam coverage. Lower power usage reduces beam coverage. These contradictory requirements are traditionally solved by a compromise between the beam coverage and the power usage based on the intended application.

There are multiple references that use segmented LEDs or a plurality of LEDs to form a single beam. None of these references, however, solve the problem of providing broad beam coverage without significantly increasing power usage. The references discussed individually below do not solve this problem, but some attempt partial solutions to the problem or, although not directed to this problem, teach structure that could be used to solve it. For example, U.S. Pat. No. 5,359,448 to Laszlo et al. is directed to a transmitter that can provide broad beam coverage, but does not deal with the issue of power consumption. U.S. Pat. No. 5,191,461 to Crawshaw et al., U.S. Pat. No. 5,212,707 to Heidel et al., and U.S. Pat. No. 5,594,752 to Endriz deal with increasing signal power using multiple illumination sources, but do not deal with broad beam coverage or power consumption. U.S. Pat. No. 5,317,170 to Paoli discloses using an array of independently addressable LEDs, that are used to provide a display. None of the references, however, solve the problem of broad beam coverage with low power consumption.

U.S. Pat. No. 5,359,448 to Laszlo et al. is directed to an infrared signal transmitter that may be used for amplifying and transmitting signals to an infrared signal receiver in a hearing device for the hearing impaired. Laszlo et al. disclose the use of a plurality of individual infrared transmitting elements sharing a protective cover. To change arrays or patterns the transmitter head must be removed and replaced. Depending on the array or pattern, broad beam coverage could be achieved.

There is, however, no explicit provision for reducing power consumption.

U.S. Pat. No. 5,191,461 to Crawshaw et al. is directed to a transceiver device that uses multiple LEDs in a line to increase signal strength. More specifically, Crawshaw et al. describe an infrared network transceiver that includes illumination sources such as a plurality of infrared LEDs arranged in a line. The illumination sources are aimed and projected in a predetermined orientation onto a reflective planar surface. Once properly positioned, the Crawshaw et al. device includes means for maintaining the predetermined orientation. The focus of this patent is increasing beam intensity, and beam coverage and power are not dealt with in this reference.

U.S. Pat. No. 5,212,707 to Heidel et al. is directed to an array of diffraction limited lasers and a method of aligning the diffraction limited lasers. The purpose of the Heidel et al. device is to provide a single spot of high intensity laser output using a standard power supply. To accomplish this, Heidel et al. disclose one-dimensional and two-dimensional arrays of laser diodes, each laser diode having an associated lens assembly. A refractive lens and a one-dimensional array of binary optical elements are used to focus the emissions of the lasers to produce a single spot of high intensity light. Multiple one-dimensional arrays may be clamped together to form two-dimensional arrays. This reference specifically teaches away from producing a larger, less intense broad beam laser output.

U.S. Pat. No. 5,594,752 to Endriz discloses a diode laser source with concurrently driven light emitting segments. Endriz discloses the use of a plurality of concurrently driven laser segments which focus on a single overlapping spot. Like the Heidel et al. reference, this reference specifically teaches away from producing a larger, less intense broad beam laser output.

U.S. Pat. No. 5,299,219 to Hayakawa is directed to a stripe-type laser diode used as a light source. This high-powered laser diode includes a one-dimensional array of independently operating narrow beam stripe lasers, a configuration which is said to minimize phase locking. All of the lasers are pointed in the same direction. To accomplish a high-power laser diode that has a wide emitting aperture and good stability, a plurality of internal waveguides are connected to a single "wide" waveguide.

U.S. Pat. No. 5,317,170 to Paoli discloses high density, independently addressable, surface emitting semiconductor laser/light emitting diode arrays without a substrate. Specifically, the patent is directed to a fabrication technique for constructing an array of emitting regions with individual contacts, supplemented by an optional fresnel or micro lens array to modify the surface emitted light. The use of multiple magnifying micro lenses in an array all pointed forward creates the effect of a larger image, such as would be appropriate for use as a display device or LED panel.

U.S. Pat. No. 5,663,581 to Holm et al. is directed to an implanted LED array and method of fabrication. Like the Paoli reference, the Holm et al. reference discloses an LED array and method of fabrication that would most likely be used for a display device or to create a display device.

BRIEF SUMMARY OF THE INVENTION

The multi-segment LED with azimuthal intensity control of the present invention combines conservative power usage and broad beam coverage. In one preferred embodiment beam steering is used to achieve low power usage. In an alternate preferred embodiment, using beam steering and providing extra power to the resulting steered beam, conservative power usage is achieved. The LED of the present invention could be used in such exemplary devices as remote control devices, hand-held computers, and cameras that rely on infrared links for communication functionality.

The present invention is directed to a power conservative multi-segment LED transmitter including a multi-segment LED with a plurality of independently addressable LED segments, each LED segment suitable for selectively emitting a beam segment. A controller selectively enables and disables the LED segments.

In one preferred embodiment of the present invention, the controller selectively enables and disables LED segments so that the respective emitted beam segments from the enabled LED segments together form a low power steered beam.

In a separate preferred embodiment of the present invention, the controller selectively enables and disables LED segments, but provides high power to the enabled LED segments so that the respective emitted beam segments from the enabled LED segments together form a power conservative steered beam that uses no more power than that required by enabling all the LED segments on low power.

In yet another separate preferred embodiment of the present invention, the LED segments are directed so that an overlapping beam pattern is formed. In this embodiment the controller selectively enables or disables LED segments so that the result is either an overlapping low power intense steered beam or, by providing extra power to the enabled LEDS, an overlapping power conservative steered beam consuming substantially no more power than the power consumed by the overlapping beam.

A steerable multi-segment LED transmitter and receiver system of the present invention, in a separate alternate preferred embodiment, includes a plurality of states: an "all enabled" state in which each of a plurality of independently addressable LED segments of the multi-segment LED are enabled and emit a respective beam segment; a "training" state in which the LED segments are selectively enabled and disabled and the receiver determines substantially detected beam segments; and a "steered" state in which only the LED segments emitting the substantially detected beam segments are enabled.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
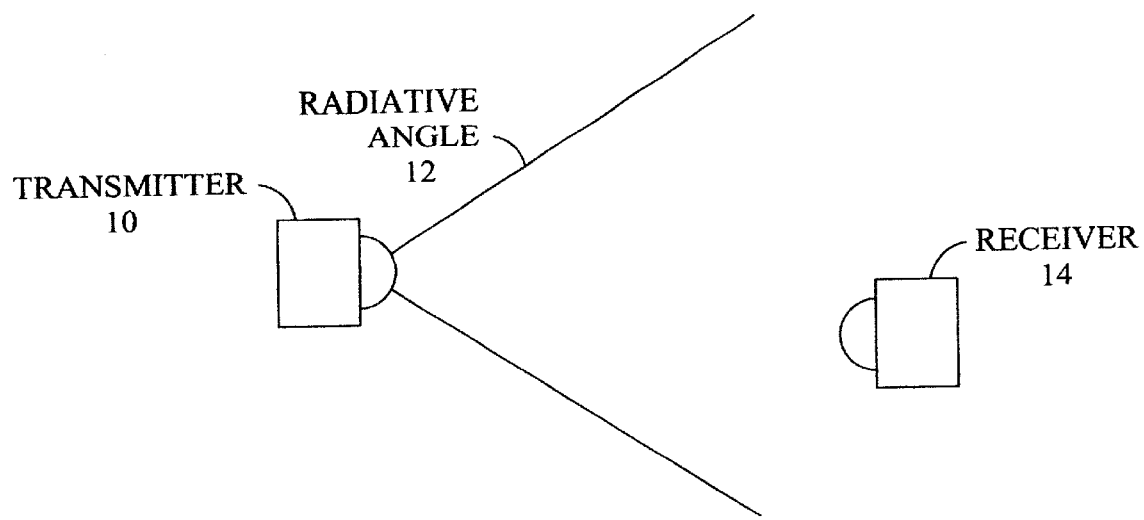
FIG. 1 is a schematic diagram of a conventional LED used in a communication link.

As shown in FIG. 1, a conventional LED communication link includes a LED transmitter 10 that emits a broad radiative angle beam 12. When a receiver 14 detects the presence of the beam 12, a communication link has been established. The entire radiative angle of the beam 12 is filled with emitted power, regardless of the location of the receiver 14 within the beam pattern 12. This results in a significant amount of wasted power.

Figure 2:
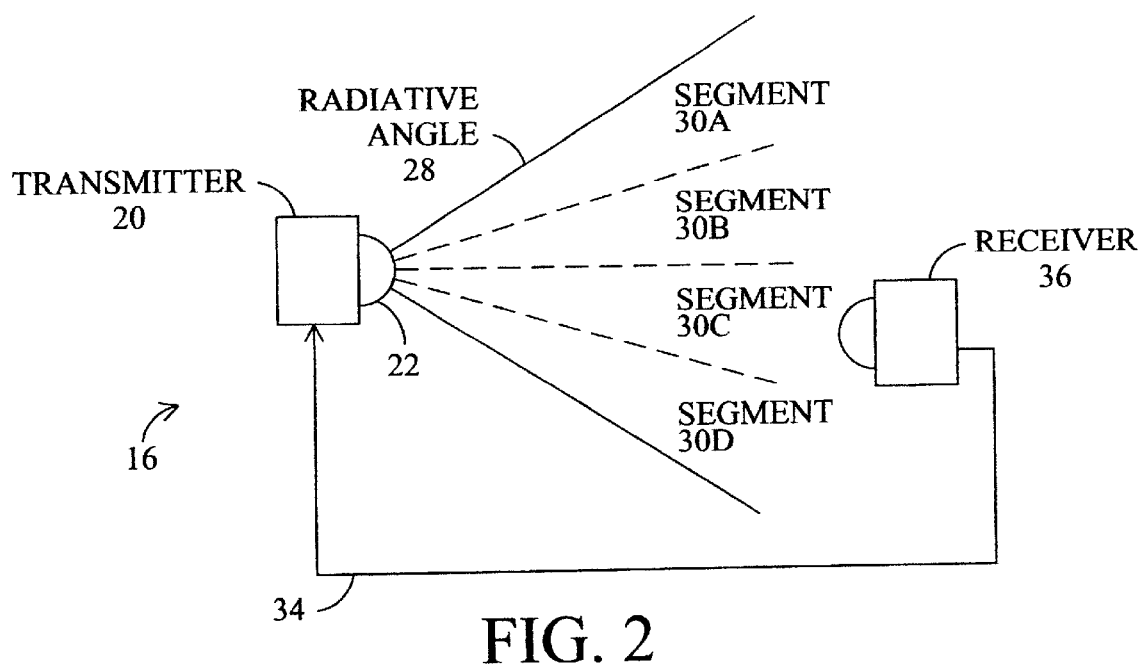
FIG. 2 is a schematic diagram of an preferred embodiment of a multi-segment LED of the present invention used in a communication link.
Figure 3:
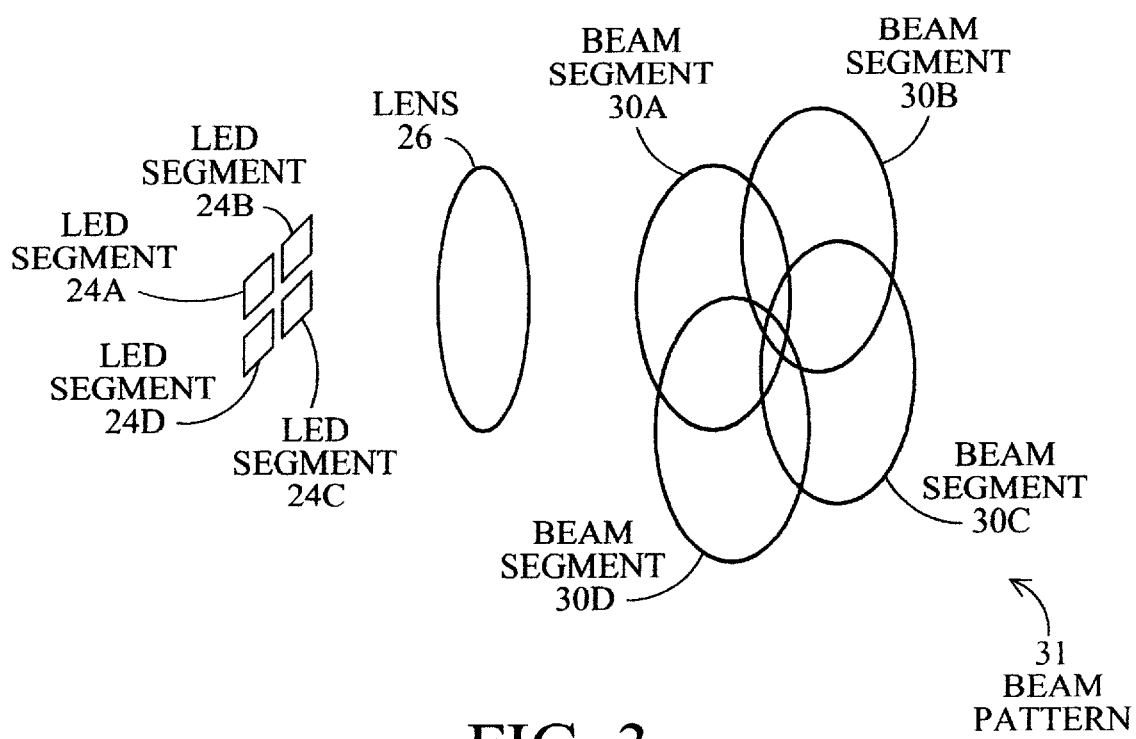
FIG. 3 is a simplified exemplary illumination pattern for a four-segment LED.

FIG. 2 and 3 show a preferred exemplary embodiment of the multi-segment light or laser emitting diode (LED) 16 with azimuthal intensity control of the present invention including a transmitter 20 with an incoherent LED 22. The LED 22 is made up of a multiplicity of distinct, independently addressable LED segments 24a–d, each of which emit light into a single lens 26. Preferably the LED segments 24a–d are formed as a two-dimensional coplanar array on a single substrate and are located near the focal point of the lens 26 so that the image produced by the assembly is at or near infinity. This structure creates a broad radiative angle beam 28 (broad beam pattern) that includes a multiplicity of individual beam segments 30a–d, each of which is centered on a distinct direction.

FIG. 3 shows an exemplary beam pattern 31 of four slightly overlapping beam segments 30a–d emanating from four LED segments 24a–d. In this exemplary beam pattern 31, each beam segment 30a–d illuminates approximately one-fourth of the total illuminated field, with some overlap to adjacent segments. When all the LED segments 24a–d are powered, the beam pattern 31 approximates the pattern for a monolithic LED of the same emitting area and power.

In one preferred embodiment, the multi-segment LED 16 provides intelligent communication protocol and uses a controller for "steering." In this embodiment, the multi-segment LED 16 includes control circuitry 32 (FIG. 4) so that, absent a specific predetermined control signal on the control lead 34, all LED segments 24a–d are powered and a complete broad beam pattern 28 results. When a control voltage is applied to Vcontrol 34 and a predetermined control signal (FIG. 5) is applied to the signal lead (Vsignal) 35, it is possible to selectively disable individual LED segments 24a–d. LED segments 24a–d that emit beam segments 30a–d that do not substantially effect the beam received by a receiver 36 are perceived as not substantially received and are disabled. Selective disabling the LED segments 24a–d reduces the total emitted power by "steering" the remaining power in a desired direction(s). FIG. 6 shows an exemplary steered pattern.

In a separate preferred embodiment the receiver 36 is connected to the transmitter 20 by the control lead 34. In this embodiment the receiver 36 provides the control signal to disable the individual LED array segments 24a–d that it is not substantially receiving while the LED segment from which the receiver 36 is receiving a signal remains enabled. In other words, the "steering" is determined directly by the receiver 36 as opposed to an outside or manual control mechanism.

The "steering" embodiments set forth above require a control system that permits selective operation of the individual LED segments 24a–d. One preferred control system that could be used to accomplish this is to provide a plurality of wires, one for each segment 24a–d, and a single ground connection. This system requires multiple connections to the multi-segment LED 16 resulting in a commensurate increase in package size and cost.

Figure 4:
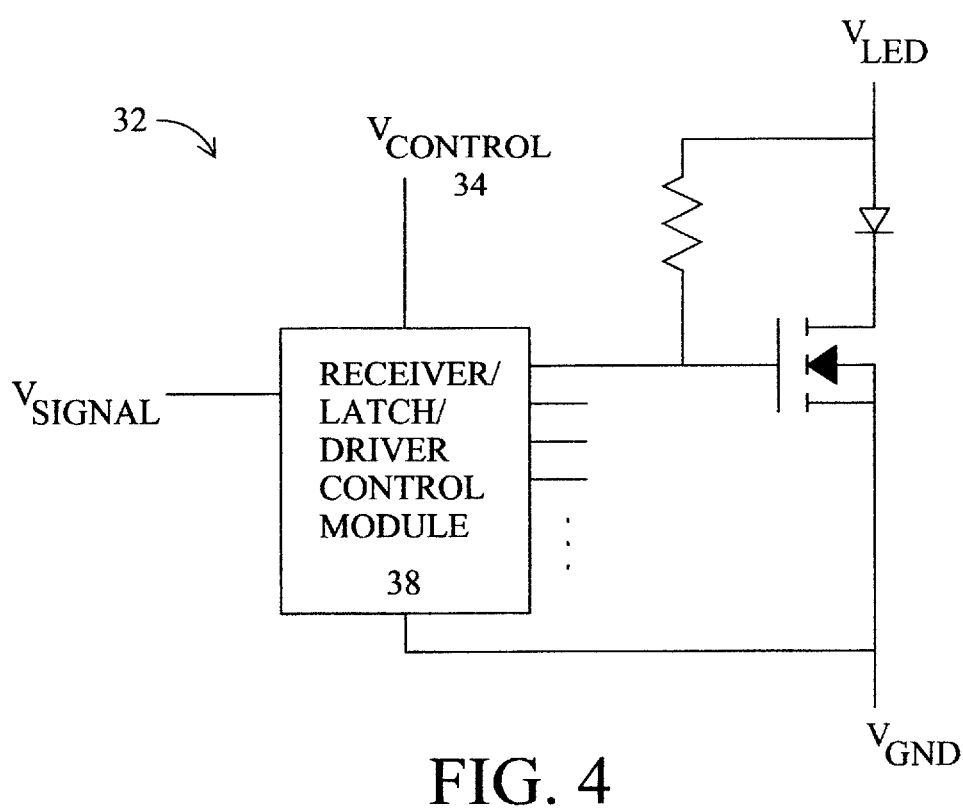
FIG. 4 is a schematic internal organization of one preferred embodiment of control circuitry for the present invention.

A separate alternate preferred control system uses a four-lead package control module 38 such as that shown in FIG. 4. The four-lead package includes a lead for the LED drive voltage, the control voltage, signal communication, and ground. This type of control module 38 would have the advantage of being able to control an arbitrary number of LED segments. As shown, each LED segment 24a–d is paired with a MOSFET switch which has a LOW resistance in the OFF state, so that failing any drive signal to the gate of the MOSFET, the LED segment would receive power.

The control module 38 is designed so that in the absence of $V_{control}$, the output drive lines are all permitted to rise to $V_{led}$, with the result that all LED segments are ON when $V_{led}$ is applied. Similarly, when $V_{control}$ is applied but no $V_{signal}$ is supplied, all segment control lines are HIGH and all LED segments are ON. The control module 38 is further designed so that when $V_{control}$ is applied, and a $V_{signal}$ burst is supplied with the appropriate voltage levels and timing, the latches for each LED segment 24a–d are set according to the voltage levels in the burst, so that upon application of $V_{led}$, only a selected subset of the LED segments 24a–d are ON.

Figure 5:
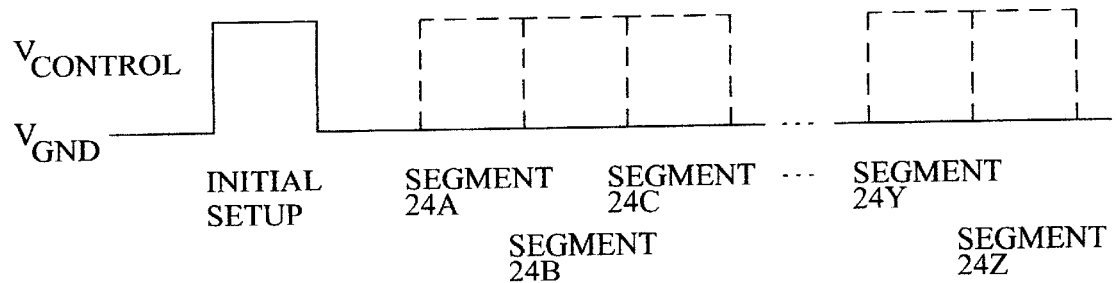
FIG. 5 is a simplified exemplary sample voltage timing sequence for segment control.
Figure 6:
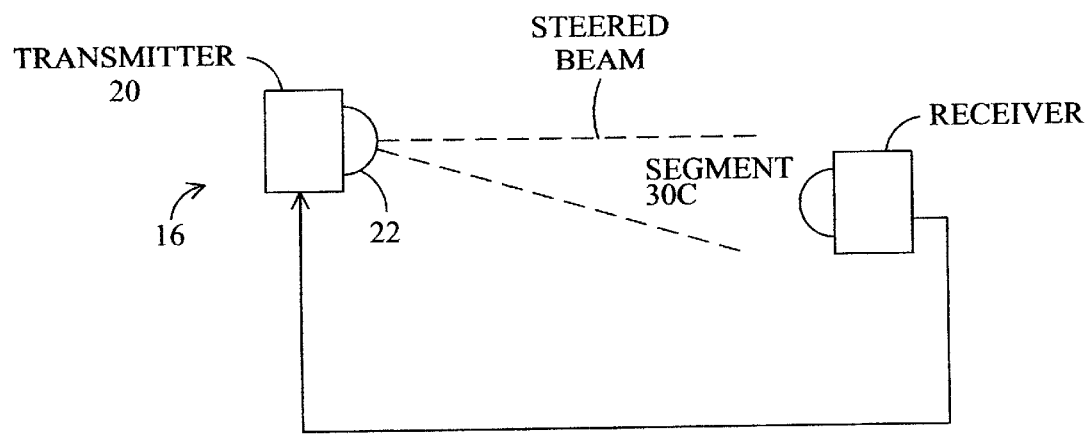
FIG. 6 is a-schematic diagram of an exemplary steered multi-segment LED of the present invention used in a communication link.

An example of a suitable timing pulse is shown in FIG. 5. An initial HIGH signal followed by a LOW signal indicates the start of a training or steering sequence, as well as pulse timing. A set of n segment voltage pulses follow, one each for the segments in the device. The voltage levels cause the internal latches to be set, thus determining which segments of the LED are ON when the $V_{led}$ driving voltage is applied.

Figure 8:
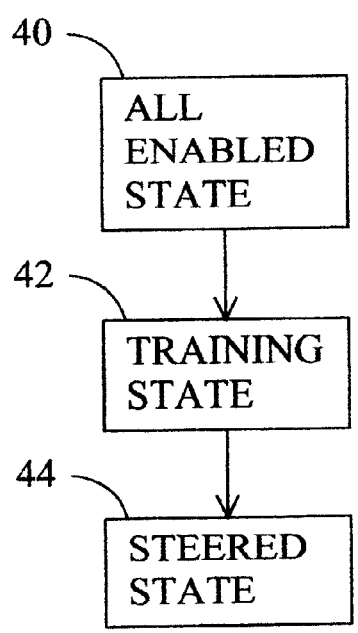
FIG. 8 is a flow chart of the states of a transmitter and receiver system of the present invention.

FIGS. 2, 6, and 8 together show a simplified exemplary embodiment of how the multi-segment LED 16 functions. In an "all enabled" state 40, the distinct, separately controlled LED segments 24a–d are all enabled so that each segment 24a–d projects a distinct beam 30a–d, each of which covers only a portion of the total beam angle 28. Then, in a "training" state 42, individual LED segments 24a–d are turned off so that the receiver 36 can determine which beam segments 30a–d substantially effect the power it receives. As shown in FIG. 2, only energy emitted within exemplary segment 30c is received by the receiver 36. In a "steered" state 44, beam segments 30a, 30b, and 30d, which do not substantially contribute to the communication path, are powered OFF without substantially affecting the power received by the receiver 36. If the received power falls below a defined threshold, all LED segments 24a–d are illuminated and the steering protocol is repeated.

Once the "training" state has been completed, the receiver 36 transmits a control signal (an exemplary version of which is shown in FIG. 5) over control lead 34 to a control module 38 (FIG. 4) that powers OFF LED segments 24a, 24b, and 24d. This results in the "steered" state such as the steered configuration shown in FIG. 6 that requires significantly less power than the configuration of FIG. 2.

A separate preferred embodiment of the multi-segment LED 16 uses a fixed or constant power output. In this embodiment the number of active segments 24a–d is reduced so that each active segment receives more power and, therefore, provides a stronger signal. In other words, the LED segments 24a–d receive a low voltage during the "all enabled" state 40. Then, when the substantially undetected LED segments are deactivated in the "steered" state 44, the remaining LED segments receive higher voltages. The stronger signal makes it possible to establish a faster connection speed and faster data transfer. If the beam segments are not overlapping, the high powered beam segments form a power conservative steered beam. If the beam segments overlap (as discussed below), the high powered beam segments form an overlapping power conservative steered beam.

Figure 7:
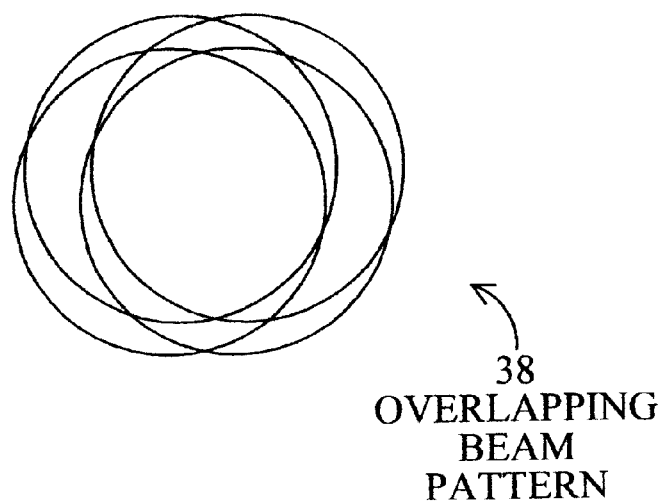
FIG. 7 is a plan view of a beam pattern of an overlapping alternate embodiment of the present invention.

Yet another separate preferred embodiment of the multi-segment LED 16 includes LED segments 24a–d that produce largely overlapping beam segments 30a–d that combine to produce an overlapping beam pattern 38 such as that shown in FIG. 7. In this configuration, turning segments 24a–d ON or OFF increases or decreases the power within the beam pattern 38, as opposed to increasing or decreasing the angular coverage of the beam. This ability would be useful to conserve power for point-to-point communications when the pointing can be controlled, but the varying distance from the transmitter 20 to the receiver 36 may require differing power levels. Thus, with each segment 24a–d transmitting at its nominal power, the total output power of the LED 22 can be adjusted by the control of individual segments 24a–d and forms an overlapping low power intense steered beam. A separate alternate preferred embodiment applies extra power to the enabled LED segments (as discussed above) to provide an overlapping power conservative steered beam.

As described above, the multi-segment LED 16 with azimuthal intensity control of the present invention is suitable for use in any battery-operated communication device utilizing an LED as a signal source. For example the multi-segment LED 16 may be used in such devices as a television remote control unit, a hand-held camera, or a palmtop computer. In such devices a significant reduction in power usage should result from having a multi-segment LED 16 as the source, coupled with an intelligent communication protocol and controller for "steering" the transmitted power to the useful segments.

The above disclosure considers only a single plane of emission and beam patterns are idealized. It should be noted that this generalization to the typical case of solid-angle emission from physical emitters is straightforward. It should also be noted that although the figures show the plurality of LED segments as four LED segments 24a–d, any number of LED segments could be included in the LED 22.

All references discussed herein are incorporated by reference. The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A power conservative multi-segment LED transmitter responsive to a receiver, comprising:

(a) a transmitter including a multi-segment LED and a controller;

(b) said LED including a plurality of independently addressable LED segments, each LED segment suitable to selectively emit a respective beam segment;

(c) a receiver for detecting said beam segments;

(d) said controller suitable to selectively enable each LED segment detected by said receiver, each enabled LED segment emitting a respective said beam segment;

(e) said controller suitable to selectively disable each LED segment not detected by said receiver; and (f) at least one emitted beam segment from at least one enabled LED segment forming a steered beam.

2. The transmitter of claim 1 wherein said steered beam is a broad beam pattern comprised of at least two at least partially nonoverlapping said emitted beam segments.

3. The transmitter of claim 1 wherein said emitted beam segments largely overlap to form a steered beam of concentrated intensity.

4. The transmitter of claim 1 wherein said LED segments emit the respective beam segments into a single lens.

5. The transmitter of claim 1 wherein said LED segments are arranged as a coplanar two-dimensional array on a single substrate.

6. The transmitter of claim 1 further comprising:
(a) said controller suitable to selectively enable all of said LED segments to form a broad beam comprised of at least partially nonoverlapping emitted beam segments, said enabled LED segments together consuming a cumulative quantity of power;
(b) said controller suitable to selectively enable and disable said LED segments, each enabled LED segment emitting a respective beam segment, the respective emitted beam segment(s) together forming a low power steered beam; and
(c) said low power steered beam consuming no more power than said cumulative quantity of power.

7. The transmitter of claim 1 further comprising:
(a) said controller suitable to selectively enable all of said LED segments to form a broad beam comprised of said emitted beam segments using a predetermined quantity of power to enable each of said LED segments, the total of said predetermined quantities of power being a cumulative quantity of power;
(b) said controller suitable to selectively disable said LED segment(s) to conserve the predetermined quantity of power for each disabled LED segment; and
(c) said controller suitable to selectively provide power greater than said predetermined quantity of power to enabled LED segment(s) that each emit a respective high powered beam segment, said respective high powered beam segment(s) together forming a power conservative steered beam, said power conservative steered beam consuming no more power than said cumulative quantity of power.

8. The transmitter of claim 1 further comprising:
(a) said controller suitable to selectively enable all of said LED segments to form an overlapping beam using a predetermined quantity of power to enable each of said LED segments, the total of said predetermined quantities of power being a cumulative quantity of power;
(b) said controller suitable to selectively disable said LED segment(s), each remaining enabled LED segment emitting a respective beam segment, said respective beam segment(s) together forming an overlapping low power intense steered beam using no more power than said cumulative quantity of power.

9. The transmitter of claim 1 further comprising:
(a) said controller suitable to selectively enable all of said LED segments to form an overlapping beam comprised of largely overlapping emitted beam segments, said overlapping beam using a predetermined quantity of power to enable each of said LED segments, the total of said predetermined quantities of power being a cumulative quantity of power;
(b) said controller suitable to selectively disable said LED segment(s) to conserve the predetermined quantity of power for each disabled LED segment;
(c) said controller suitable to provide power greater than said predetermined quantity of power to each remaining enabled LED segment(s) that emit a respective high powered beam segment(s); and
(d) said respective high powered beam segment(s) together forming an overlapping power conservative steered beam, said overlapping power conservative steered beam consuming no more power than said cumulative quantity of power.

10. A multi-segment LED transmitter system, said system comprising:
(a) a transmitter including a multi-segment LED and a controller;
(b) said LED including a plurality of independently addressable LED segments, each LED segment for selectively emitting a respective beam segment;
(c) said controller suitable to selectively enable and disable said LED segments, each enabled LED segment emitting a respective beam segment;
(d) a beam pattern comprised of at least two of said emitted beam segments at least partially overlapping; and
(e) a receiver suitable to signal said controller to enable and disable selective LED segments, each enabled LED segment emitting a respective emitted beam segment, the respective emitted beam segment(s) together forming a steered beam.

11. The system of claim 10 wherein said LED segments emit the respective beam segments into a single lens.

12. The system of claim 10 wherein said LED segments are arranged as a coplanar two-dimensional array on a single substrate.

13. A method for conserving power in a multi-segment LED, said method comprising the steps of:
(a) a controller enabling a plurality of independently addressable LED segments, each enabled LED segment emitting a respective beam segment;
(b) directing said beam segments toward a receiver;
(c) selectively enabling and disabling each of said LED segments to determine which beam segments said receiver detects, said receiver receiving and detecting at least one of said beam segments;
(d) said receiver signaling said controller to disable LED segments emitting undetected beam segments.

14. The method of claim 13 further comprising the steps of:
(a) said step of said controller enabling a plurality of independently addressable LED segments further comprising the step of emitting a broad beam comprised of a plurality of said respective beam segments; and
(b) said controller selectively enabling and disabling said LED segments, each enabled LED segment emitting a respective beam segment, the respective emitted beam segment(s) together forming a low power steered beam.

15. The method of claim 13 further comprising the steps of:
(a) said step of said controller enabling a plurality of independently addressable LED segments further comprising the step of emitting a broad beam comprised of a plurality of said respective beam segments; and
(b) said controller selectively disabling said LED segments and selectively providing extra power to enabled LED segments that emit a respective high powered beam segment, said respective high powered beam segment(s) together forming a power conservative steered beam, said power conservative steered beam consuming no more power than the power consumed by said broad beam.

16. The method of claim 13 further comprising the steps of:
(a) said step of said controller enabling a plurality of independently addressable LED segments further comprising the step of emitting an overlapping beam comprised of a plurality of said respective beam segments overlapping each other; and (b) said controller selectively disabling said LED segments, each remaining enabled LED segment emitting an enabled respective beam segment, said enabled respective beam segment(s) together forming an overlapping low power intense steered beam.

17. The method of claim 13 further comprising the steps of:

(a) said step of said controller enabling a plurality of independently addressable LED segments further comprising the step of emitting an overlapping beam comprised of a plurality of said respective beam segments overlapping each other; and (b) said controller selectively disabling said LED segments and said controller providing extra power to each remaining enabled LED segments that emit an enabled respective high powered beam segment, said enabled respective high powered beam segment(s) together forming an overlapping power conservative steered beam, said overlapping power conservative steered beam consuming no more power than the power consumed by said overlapping beam.

18. A steerable multi-segment LED transmitter and receiver system, comprising:

(a) an "all enabled" state in which each of a plurality of independently addressable LED segments of said multi-segment LED are enabled, each enabled LED segment emitting a respective beam segment;

(b) a "training" state in which said LED segments are selectively enabled and disabled, said receiver determining detected beam segment(s); and (c) a "steered" state in which only said LED segment(s) emitting said detected beam segment(s) are enabled.

19. A method for producing a steered beam using a multi-segment LED, said method comprising the steps of:

(a) enabling a plurality of independently addressable LED segments in said multi-segment LED, each enabled LED segment emitting a respective beam segment;

(b) directing said beam segments toward a receiver;

(c) for each LED segment of said multi-segment LED, disabling selectively said LED segments;

(d) receiving and detecting at least one of said beam segments having a predetermined signal strength using said receiver during said step of disabling selectively said LED segments;

(e) signaling said multi-segment LED to disable LED segments emitting beam segments having a signal strength less than said predetermined signal strength;

(f) disabling said LED segments emitting beam segments having a signal strength less than said predetermined signal strength;

(g) enabling said LED segments emitting beam segments having a signal strength greater than said predetermined signal strength; and (h) emitting a steered beam comprised of said beam segments emitted from said enabled LED segments.

20. The method of claim 18, wherein said step of emitting a steered beam comprised of said beam segments emitted from said enabled LED segments further comprising the step of emitting a steered beam comprised of a single beam segment emitted from a single enabled LED segment.

* * * * *

UNITED STATES PATENT AND TRADEMARK OFFICE
CERTIFICATE OF CORRECTION

PATENT NO. : 6,606,175 B1
DATED : August 12, 2003
INVENTOR(S) : Sampsell et al.

It is certified that error appears in the above-identified patent and that said Letters Patent is hereby corrected as shown below:

Column 3,
Line 14, delete "LEDS", insert -- LEDs --.
Line 39, delete "an preferred", insert -- a preferred --.
Line 49, delete "a-schematic", insert -- a schematic --.

Column 5,
Line 1, delete "Of", insert -- of --.

Column 10,
Line 27, delete "18", insert -- 19 --.

Signed and Sealed this

Twenty-second Day of June, 2004

JON W. DUDAS
*Acting Director of the United States Patent and Trademark Office*